United States Patent [19]

Cerreta

[11] Patent Number: 4,547,143
[45] Date of Patent: Oct. 15, 1985

[54] BITE SIZE CANDY MOLDING MACHINE

[76] Inventor: James J. Cerreta, 2866 Grand Ave., Phoenix, Ariz. 85017

[21] Appl. No.: 629,201

[22] Filed: Jul. 9, 1984

[51] Int. Cl.$^4$ .......................... A23G 1/20; A23G 3/18
[52] U.S. Cl. .................................... 425/447; 222/166; 425/470; 426/504; 426/512
[58] Field of Search ............... 425/200, 318, 447, 435, 425/442, 256, 258, 470, 206, 472; 426/504, 512; 249/120, 119, 134

[56] References Cited

U.S. PATENT DOCUMENTS 1,882,682  10/1932  Abram ................................. 425/442

Primary Examiner—Willard E. Hoag
Attorney, Agent, or Firm—Warren F. B. Lindsley

[57] ABSTRACT

A molding apparatus for bite size pieces of candy employing coplanarly arranged mixing and dispensing trays having juxtapositioned openings in their rims and having a rack positioned below said dispensing tray for supporting a multi-cavity mold, the opening of which when mounted on said rack is exposed through an opening in the bottom of said dispensing tray, and means for rotating said dispensing tray relative to said mixing tray for placing on and removing from the mold from the rack.

9 Claims, 9 Drawing Figures

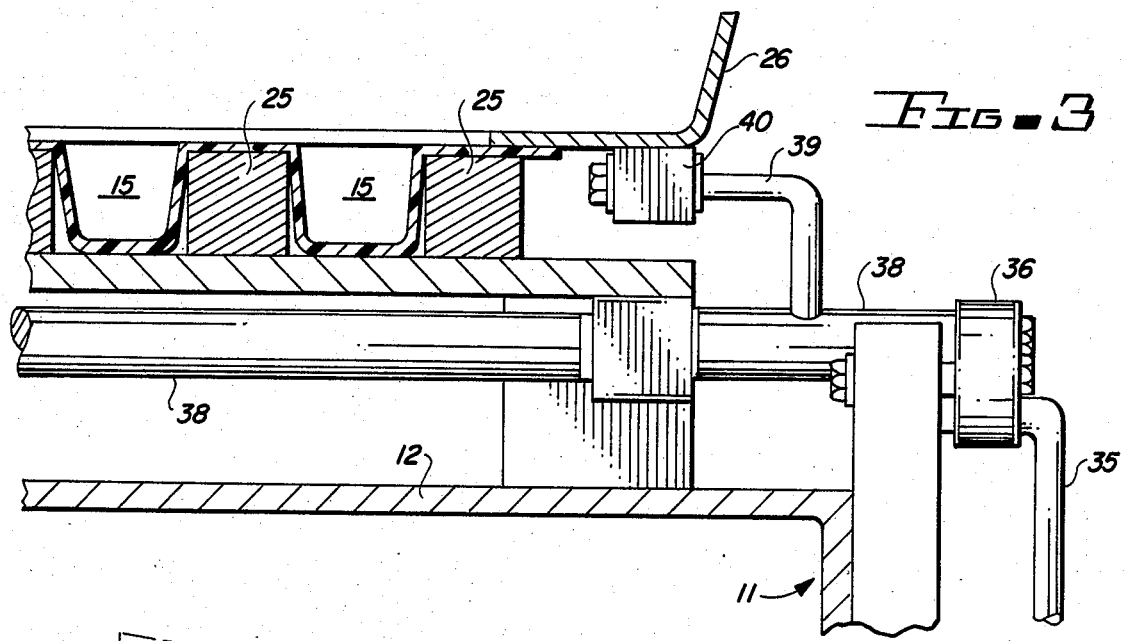
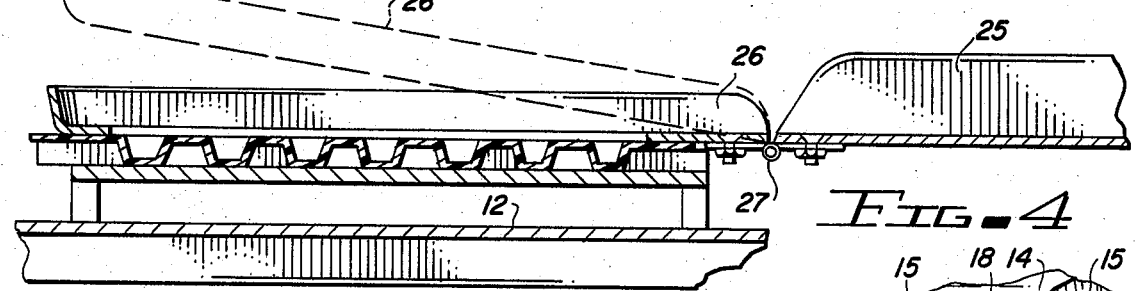
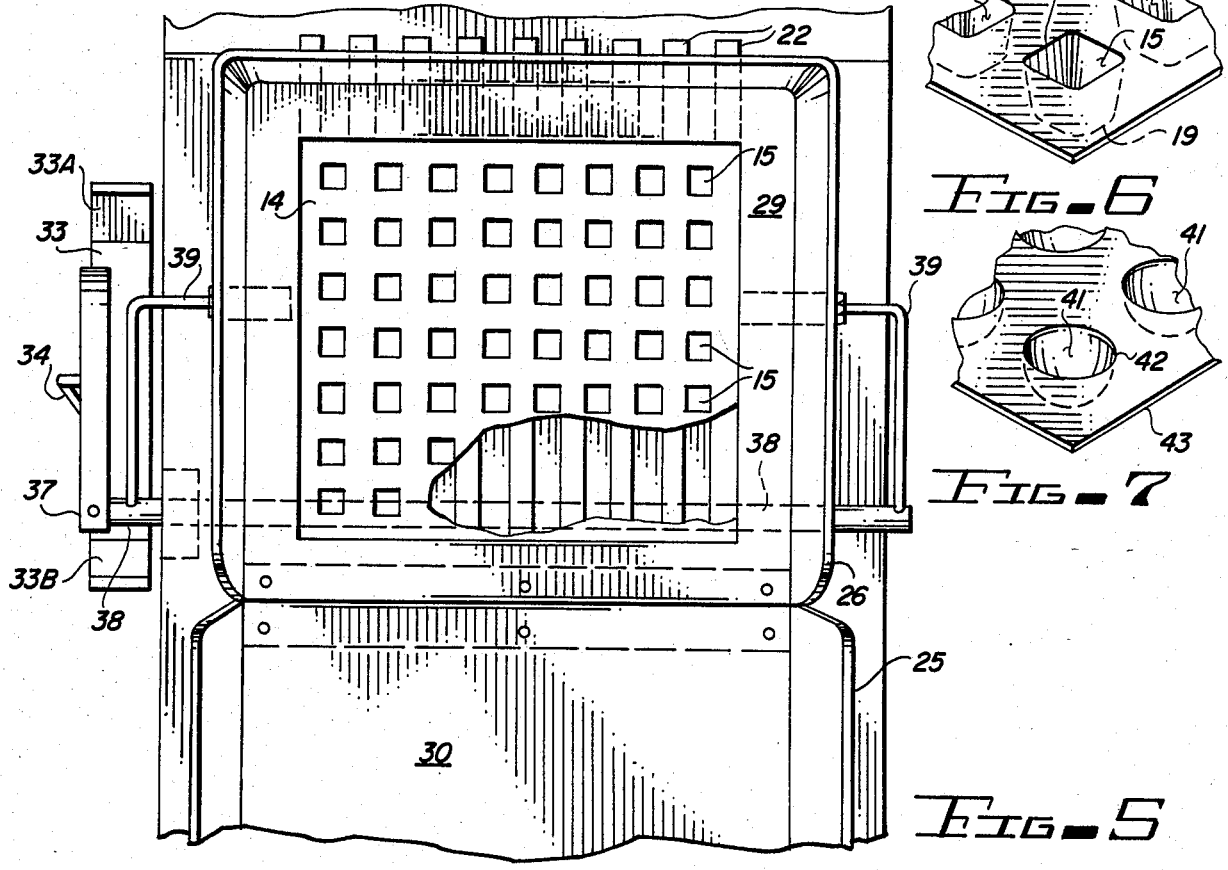

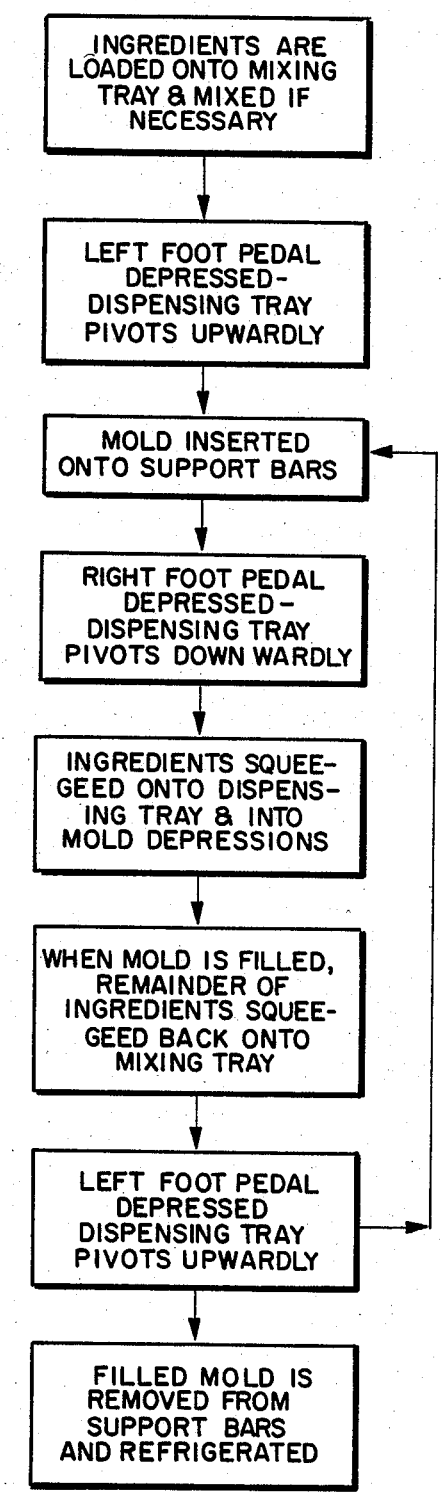
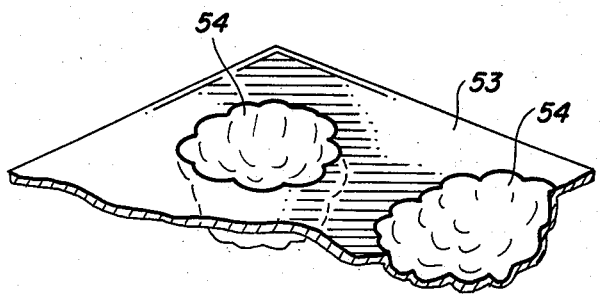
FIG-8
FIG-9

BITE SIZE CANDY MOLDING MACHINE

BACKGROUND OF THE INVENTION

This invention relates to confectionery manufacture and more particularly, to the molding of candy formed from sugar solutions and other essential ingredients well known in the art including egg albumen and other emulsifying agents, such as algimates, gums, gelatins, starches, nuts, fruits, artificial flavors, acids and colors.

The sugar solutions are formed into a sticky mass and as it cools, it is placed into individual molds to form individual pieces of bite size items.

Although continuous molding processes have been known employing banks of molds forming individual bite size candy pieces, a need exists for an apparatus employing a single removable mold which partially mechanizes the manufacture of hand crafted fancy and higher priced candies.

DESCRIPTION OF THE PRIOR ART

While automatic molding apparatus for forming bite size pieces of machine produced candy have been known, a simple and inexpensive apparatus is needed wherein an operator may control the ingredients of each mold and its removal from the apparatus in order to maintain individual control of each piece of candy as traditionally done in the manufacture of quality confectionery.

SUMMARY OF THE INVENTION

In accordance with the invention claimed, a new and improved apparatus is provided for the partial mechanization by an individual operator of the making of soft and fancy candies.

It is, therefore, one object of this invention to provide a new and improved candy molding apparatus for individual use in the controlled manufacture of soft candies.

Another object of this invention is to provide a new and improved candy molding apparatus employing a single cluster mold wherein an operator can individually control the type and amount of material being placed in the mold.

A further object of this invention is to provide a new and improved candy molding apparatus in which an operator places and removes each mold from the apparatus so as to maintain close control over the ingredients and number of candy pieces being manufactured.

A still further object of this invention is to provide a new and improved candy molding apparatus that partially mechanizes the manufacture of the normally individually produced pieces of candy by a simple and inexpensive manufacturing apparatus, but maintains the control of each piece of candy molded by the operator.

A still further object of this invention is to provide a simple, individually operable, single mold candy manufacturing apparatus for bite size pieces which may be readily taken apart and cleaned after each use.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 3 is an enlargement of the circled area in FIG. 2 marked with the reference character 3;

FIG. 4 is a cross-sectional view of FIG. 1 taken along the line 4—4;

FIG. 5 is a partial top view of FIG. 1 with portions broken away to show other details;

FIG. 6 is an enlarged partial view of a portion of the mold shown in FIG. 1;

FIG. 7 is an enlarged partial view of a modification of the mold shown in FIG. 1;

FIG. 8 is an enlarged partial view of a further modification of the mold shown in FIGS. 6 and 7 illustrating a cavity having an uneven periphery known in the trade as a "nut cluster;" and FIG. 9 illustrates in a block diagram the step by step use of the molding apparatus shown in FIG. 1.

DESCRIPTION OF THE PREFERRED EMBODIMENT

Referring more particularly to the drawings by characters of reference, FIG. 1-5 disclose a candy molding apparatus 10 comprising a support such as a table 11 having mounted on its top 12 a rack 13 for receiving therein a mold having a plurality of cavities, hereinafter called a multi-cavity mold 14.

Figure 1:
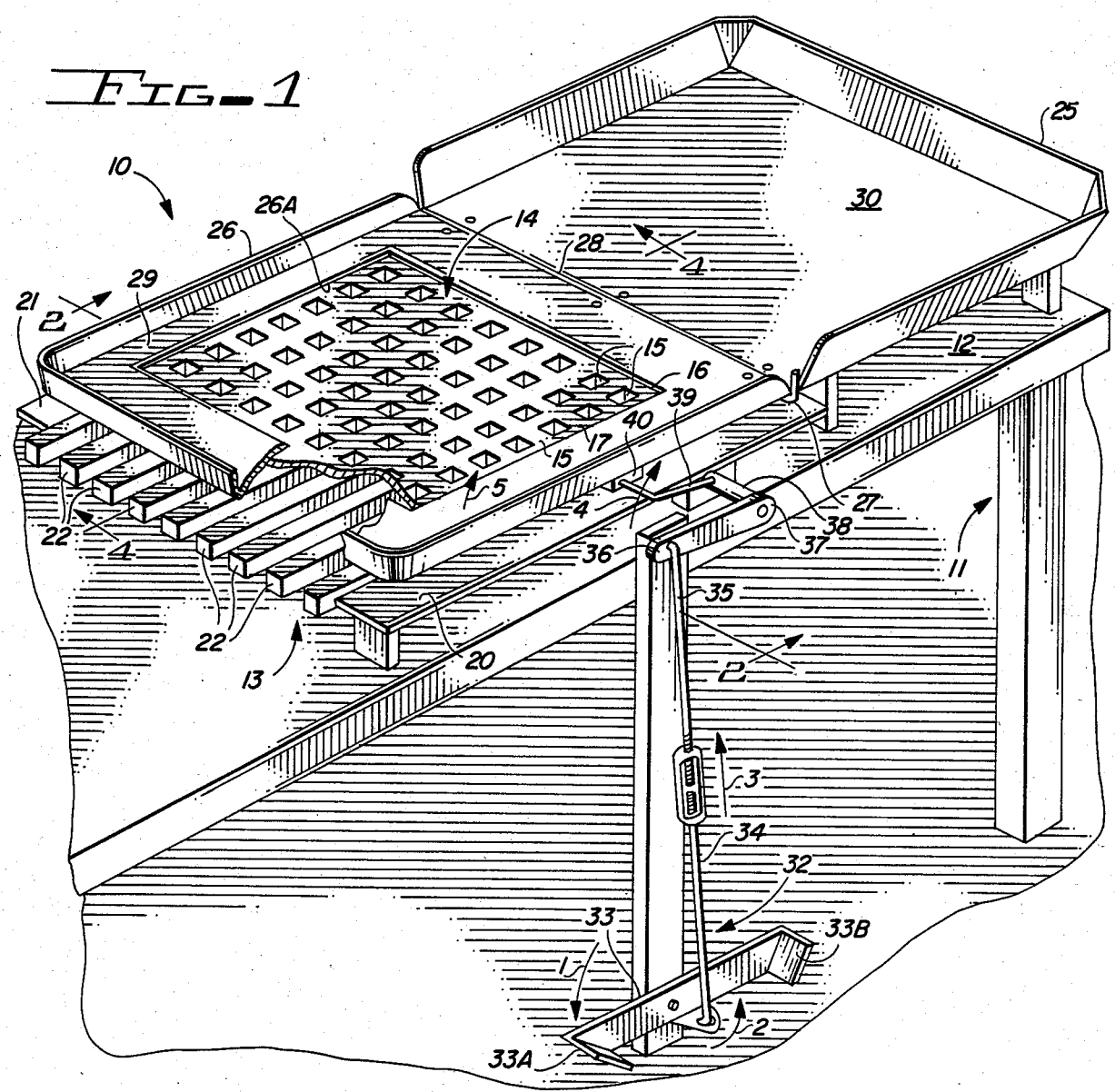
FIG. 1 is a perspective view of a cluster cavity mold forming apparatus wherein the operator individually controls the movement of the material in and out of the mold.

Mold 14 comprises a sheet of a suitable plastic material that is distorted or displaced to form a plurality of cavities 15 aligned in parallel rows 16 to extend downwardly, as shown in FIG. 1, from the top surface 17 of the mold. The periphery of each of the cavities 15 are of similar configuration with a top 18 and a bottom 19 of the cavities arranged in parallel planes.

Figure 2:
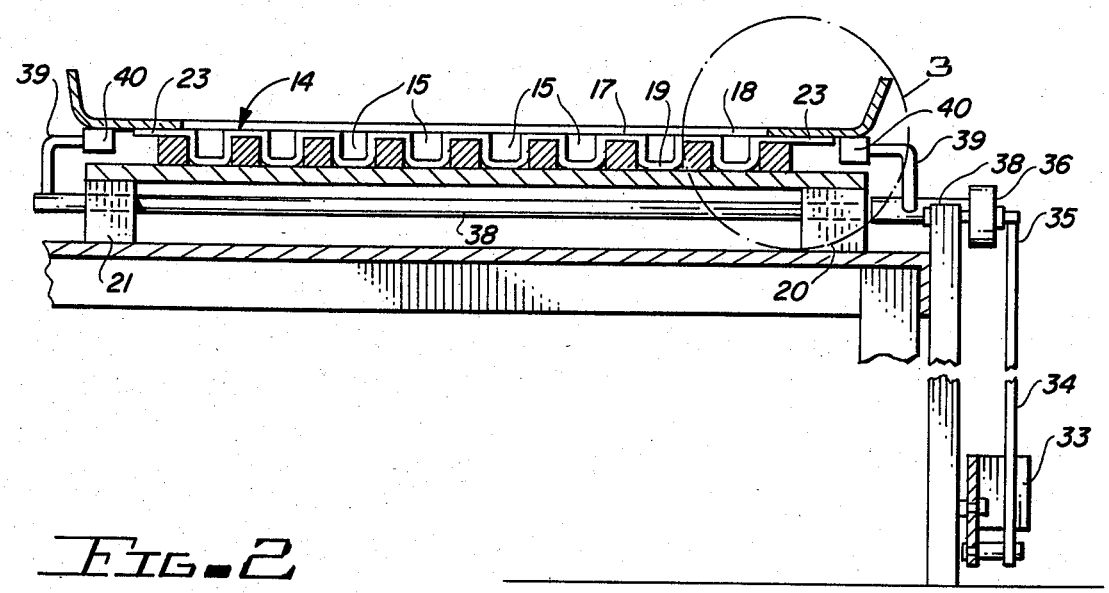
FIG. 2 is a cross-sectional view of FIG. 1 taken along the line 2—2.

Rack 13 comprises a pair of parallelly arranged side rails 20 and 21 which are spaced above top 12 of table 11 a predetermined distance and have a plurality of rails 22 spacedly arranged therebetween in rows parallel thereto. The rows are so spaced one from another such that the outer periphery of the cavities of the mold may be positioned therebetween, as shown in FIG. 2. Thus, when mold 14 is so aligned with the left end of rack 13, the mold may be slid over the top of rails 22 with the periphery 23 of the sheet of plastic material forming the sides of the mold resting on the outermost rails and the cavities of the mold extending within the space between rails 22, as shown.

As shown in FIG. 1, a material receiving flat bottom mixing tray 25 having a rim around a portion of its periphery and defining an opening in the remainder of its periphery is mounted on table 12 at a point juxtapositioned to the end of rack 13. At a predetermined distance above the top of rack 13 is mounted a flat bottom dispensing tray 26 having a rim around a portion of its periphery and the remainder of its periphery defining an opening arranged juxtapositioned to the opening of the mixing tray. Tray 26 is mounted to the open side 28 of tray 25 by hinge 27 such that when tray 26 is pivotally moved to its position shown in FIG. 1 over and on top of mold 14, which has been previously placed over rails 22, the top surface 29 of tray 26 will be in the same plane as the top surface 30 of tray 25.

Tray 26 comprises a picture frame-like structure defining an axially arranged opening 31, the periphery of which surrounds and exposes all of the cavities 15 in mold 14. The raising of tray 26 to expose mold 14 and to permit its removal from rack 13 and the lowering of tray 26 to its horizontal position over mold 14, as shown in FIG. 1, is accomplished by a foot control 32.

This foot control comprises a pivotally movable foot lever 33, the rotation of which moves an adjustable connecting rod 34 connected at one end thereto up or down depending on the direction of rotation of lever 33. The other end 35 of connecting rod 34 is pivotally connected to one end of a lever 36 with lever 36's other end 37 being fixedly connected to a rod 38 extending laterally thereof and through and journaled in side rails 20 and 21 of apparatus 10. To each end of rod 38 is fixedly secured a right angle rod 39, the free end of which is journaled in a block 40 on the bottom of tray 26.

Thus, when lever 33 is rotated to raise connecting rod 34, tray 26 will be pivotally rotated about its hinge 27 to expose mold 14 so that it may be slid along rails 22 to their left ends, as shown in FIG. 1, for removal from the apparatus. When lever 33 is rotated the other direction, the downward movement of connecting rod 34 will pivotally move tray 26 counterclockwise, as shown in FIG. 1, about its hinge 27 to place the tray in a horizontal position over mold 14.

FIG. 6 illustrates in more detail the shape of cavity 15 illustrating that it has a four sided block like outer geometrical configuration while FIG. 7 illustrates a modification of the cavity wherein cavities 41 comprise an inverted dome or conical shaped configuration with the aperture at the top 42 of the mold 43 having a circular outline.

FIG. 8 illustrates a mold 53 having a plurality of cavities 54 of an uneven outline forming a piece of candy known in the trade by the name "nut cluster."

OPERATION

FIG. 9 illustrates in block diagram the steps of operating the molding apparatus 10 thereby partially mechanizing the normally hand operation for manufacturing fancy and high priced bite size pieces of soft candy.

In utilizing apparatus 10, most of the ingredients for the particular candy being molded may be prepared at a work station away from apparatus 10 with the final mixture of the material occurring in the mixing tray 25. For example, nuts, fruits, or the like may be added to a common material mix as a final step in the mixing process on surface 30 of mixing tray 25.

After the final mixing of the material from which the candy is to be molded, the left foot rest 33A is depressed in a counterclockwise direction causing connecting rod 34, lever 36, rod 38 and rod 39 to pivot mixing tray 26 clockwise about its hinge 27. This action exposes rack 13 and at this time, mold 14 is placed on or slid over the rails 22 with the bottoms of the cavities of the mold extending downwardly between the rails, as shown in FIG. 2. The mold is so positioned that when tray 26 is moved down and over it, the cavities 15 will be exposed in opening 26A of tray 26.

The right foot rest 33B of lever 33 is then depressed in a clockwise direction causing connecting rod 34, lever 36 and rods 38 and 39 to pivot mixing tray 26 in a counterclockwise direction causing it to rest on top of and over mold 14 exposing cavities 15.

The ingredients or material mix for the bite size candy pieces on the surface 30 of mixing tray 25 is then squeegeed onto dispensing tray 26 and into all of the cavity openings. When all of the cavities are full, the remainder of the ingredients or material is then squeegeed back onto the top surface of mixing tray 25.

The left foot rest 33A of the lever is again depressed in a counterclockwise direction to cause tray 26 to pivotally move upwardly in a clockwise direction, thereby exposing mold 14 with its material filled cavities.

Mold 14 is then slid to the left, as shown in FIG. 1, off of rails 22 and placed in a refrigerator to harden thereby completing the candy forming operation.

Another mold 14 is then inserted in the apparatus and the sequence of steps are repeated as indicated by the arrows in FIG. 9.

It should be noted that a simple and efficient molding appatatus is disclosed that may be easily used in mechanizing the hand making of fancy and high priced candy, but also a machine that may be taken apart and cleaned with a minimum of effort. To remove tray 26 from the structure, it is merely necessary to remove the pins of hinge 27 from each side of the apparatus, thus exposing all parts of the apparatus for cleaning purposes.

An improved candy molding apparatus is thus provided in accordance with the stated objects of the invention and although but a few embodiments of the invention have been illustrated and described, it will be apparent to those skilled in the art that various changes and modifications may be made therein without departing from the spirit of the invention or from the scope of the appended claims.

What is claimed is:

1. An apparatus for molding bite size pieces of candy comprising:

a support, a flat bottom mixing tray mounted on said support, said mixing tray having a rim extending around only a first portion of its periphery with the remainder of its periphery forming a first opening, a flat bottom dispensing tray having a rim extending around only a portion of its periphery with the remainder forming a second opening, hinge means for pivotally connecting said mixing tray and said dispensing tray together at the first and second openings so that the flat bottoms of said mixing tray and said dispensing tray can be coplanar when said dispensing tray is in a predetermined horizontal position, said dispensing tray defining a third opening in its flat bottom, a rack mounted on said support below said mixing tray in a position parallel with said dispensing tray when in said predetermined horizontal position, a mold defining a plurality of cavities mountable on said rack below said mold in a position to expose said cavities through said third opening in said dispensing tray, and means for pivotally moving said dispensing tray relative to said mixing tray to expose said rack in order to place thereon and to remove therefrom said mold.

2. The apparatus set forth in claim 1 wherein:

said rack comprises a plurality of parallel coplanarly arranged spaced rails, and said mold comprises a flat sheet of material defining a plurality of cavities, the periphery of which is displaced in the same direction from the plane surface of said sheet of material, said cavities being arranged in rows so as to fit between said rails when said mold is mounted on said rack.

3. The apparatus set forth in claim 2 wherein:

said sheet is formed from a plastic material with the cavities of said mold being displaced in a like direction a like distance from said plane surface.

4. The apparatus set forth in claim 2 wherein:

said means for pivotally moving said dispensing tray comprises a foot operated means.

5. The apparatus set forth in claim 4 wherein:

said foot operated means comprises a foot pedal connected through a lever mechanism to said dispensing tray for pivotally moving it about said mixing tray in one direction to expose said rack and pivotally moving it in another direction for placing it in a horizontal position with said mixing tray.

6. An apparatus for molding bite size pieces of candy comprising:

a flat bottom mixing tray, said mixing tray having a rim defining a first opening therein, a flat bottom dispensing tray, said dispensing tray having a rim defining a second opening therein, hinge means for pivotally connecting said mixing tray and said dispensing tray together so as to arrange the first opening and the second opening juxtapositioned to each other with the flat bottoms of the dispensing and mixing trays being coplanar in a given horizontal position, said dispensing tray defining a third opening in its flat bottom, a rack mounted below said mixing tray in a position parallel with said dispensing tray when in said predetermined horizontal position, a mold defining a plurality of cavities mountable on said rack below said mold in a position to expose said cavities through said third opening in said dispensing tray, and means for pivotally moving said dispensing tray relative to said mixing tray to expose said rack in order to place thereon and to remove therefrom said mold.

7. The apparatus set forth in claim 6 wherein:

said rack comprises a plurality of parallel coplanarly arranged spaced rails, and said mold comprises a flat sheet of material defining a plurality of cavities, the periphery of which is displaced in the same direction from the plane surface of said sheet of material, said cavities being arranged in rows so as to fit between said rails when said mold is mounted on said rack.

8. The apparatus set forth in claim 7 wherein:

said means for pivotally moving said dispensing tray comprises a foot operated means.

9. The apparatus set forth in claim 8 wherein:

said foot operated means comprises a foot pedal connected through a lever mechanism to said dispensing tray for pivotally moving it about said mixing tray in one direction to expose said rack and pivotally moving it in another direction for placing it in a horizontal position with said mixing tray.

* * * * *